(12) United States Patent
Nagai et al.

(10) Patent No.: US 7,066,649 B2
(45) Date of Patent: Jun. 27, 2006

(54) ACTUATOR

(75) Inventors: Shigekazu Nagai, Ibaraki (JP); Akio Saitoh, Ibaraki (JP)

(73) Assignee: SMC Corporation, Tokyo (JP)

( * ) Notice: Subject to any disclaimer, the term of this patent is extended or adjusted under 35 U.S.C. 154(b) by 146 days.

(21) Appl. No.: 10/813,147

(22) Filed: Mar. 30, 2004

(65) Prior Publication Data

US 2004/0198541 A1    Oct. 7, 2004

(30) Foreign Application Priority Data

Apr. 7, 2003  (JP) .............................. 2003-103157

(51) Int. Cl.
*F16C 29/08* (2006.01)
*F16J 15/43* (2006.01)

(52) U.S. Cl. .................... 384/15; 74/89.4; 277/410; 384/446

(58) Field of Classification Search ............... 384/7, 384/15, 446; 277/410, 904; 74/89.4, 89.41, 74/89.23, 89.33, 89.34
See application file for complete search history.

(56) References Cited

U.S. PATENT DOCUMENTS

| 4,057,258 A | * | 11/1977 | Ernst et al. ............... 277/345 |
| 4,481,869 A | * | 11/1984 | Garlapaty ................. 277/345 |
| 4,953,424 A | * | 9/1990 | Lazzari ..................... 74/566 |
| 6,200,030 B1 | * | 3/2001 | Katoh ...................... 384/15 |
| 6,241,230 B1 | * | 6/2001 | Kawaguchi ............... 384/15 |
| 6,344,718 B1 | * | 2/2002 | Nagai et al. .............. 318/14 |
| 6,626,571 B1 | * | 9/2003 | Kato et al. ................. 384/15 |

FOREIGN PATENT DOCUMENTS

| JP | 09-201002 | 7/1997 |
| JP | H9-201002 | 7/1997 |

* cited by examiner

*Primary Examiner*—Thomas R. Hannon
(74) *Attorney, Agent, or Firm*—Peter Ganjian

(57) ABSTRACT

In an actuator, displacement resistance in axial movement of a slider is reduced to improve durability and enhance maintainability. At each side of the actuator, a slit is made between a top cover and a side cover. Magnetic bodies are provided on the surfaces of both side walls of the slit which face a fixing block of a slider and a magnetic fluid with a viscosity, surface tension, etc. is held between the magnetic bodies. At each side, the fixing block of the slider axially moves along the slit which is closed by the magnetic bodies.

4 Claims, 8 Drawing Sheets

ACTUATOR

BACKGROUND OF THE INVENTION

1. Field of the Invention

The present invention relates to an actuator which transports a workpiece by moving a slider axially by a rotational driving force of a rotational driving source.

2. Description of the Related Art

The present invention proposes an actuator which is used as a means for transporting a workpiece. (See patent literature 1.)

This actuator consists of: a rotational driving source which is located inside an actuator body; a driving force transmitting means, such as a ball screw, which transforms the rotational driving force of the rotational driving source into a linear motion; and a slider which moves along the axis of the actuator body through the driving force transmitting means.

On the top surface of the actuator body is a slit-like groove which is formed axially as an opening and part of the slider, which is movably located in the actuator body, moves along the groove.

A seal member made of elastic material such as rubber is attached to the groove. It closes the groove in order to prevent dust invasion from outside.

The seal member is located so that it can be divided toward both sides of the groove along the moving direction of the slider. While the slider moves along the groove axially, the slider end on the advance direction side of the slider splits the seal member towards both side faces of the groove. This means that even while the slider is moving, the groove remains closed by the seal member. See JP-A No. 201002/1997 (paragraphs 22 to 24).

SUMMARY OF THE INVENTION

The present invention has been made in connection with the above proposal and provides an actuator which reduces the displacement resistance of the moving slider to improve durability and eliminates the need for troublesome maintenance.

In order to achieve the above object, the present invention provides an actuator which transforms rotational driving force of a rotational driving source into a linear motion through a driving force transmitter and moves a slider axially to transport a workpiece. Here, the actuator comprises: a body in which the driving force transmitter is located; a slider which is partially exposed from a slit extending along the length of the body and moves along the axis of the body; a pair of magnetic bodies which extend along the slit by a prescribed length and face each other with the slider between them; and a magnetic fluid which is held between the pair of magnetic bodies, closing the slit, and is split by the slider as the slider moves.

According to one aspect of the present invention, the pair of magnetic bodies is provided along the slit in which the slider moves, facing each other and the slit is closed by a magnetic fluid. When the slider moves in the slit along the axis of the body, the magnetic fluid on the advance direction side of the slider is split by the slider and the magnetic fluid thus split by the slider closes the slit again on the slider side opposite to the advance direction side. Therefore, regardless of movement of the slider, the slit is kept properly closed by the magnetic fluid.

This prevents dust or other foreign matter from outside from entering into the inside of the actuator through the slit, and prevents dust or other foreign matter generated inside the actuator from flowing out through the slit.

Since the slit is closed by the magnetic fluid as a liquid, the displacement resistance is reduced as the slider moves along the slit; as a consequence, the slider can move more smoothly.

According to another aspect of the present invention, a slit is provided, between a first cover of the body and a second cover, which is located away from the first cover by a prescribed distance virtually vertically. Hence, even when the slider moves splitting the magnetic fluid which closes the slit, invasion of dust in the atmospheric air into the body is prevented more effectively.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, an actuator sealing structure according to preferred embodiments of the present invention will be described in detail referring to the accompanying drawings.

Figure 1:
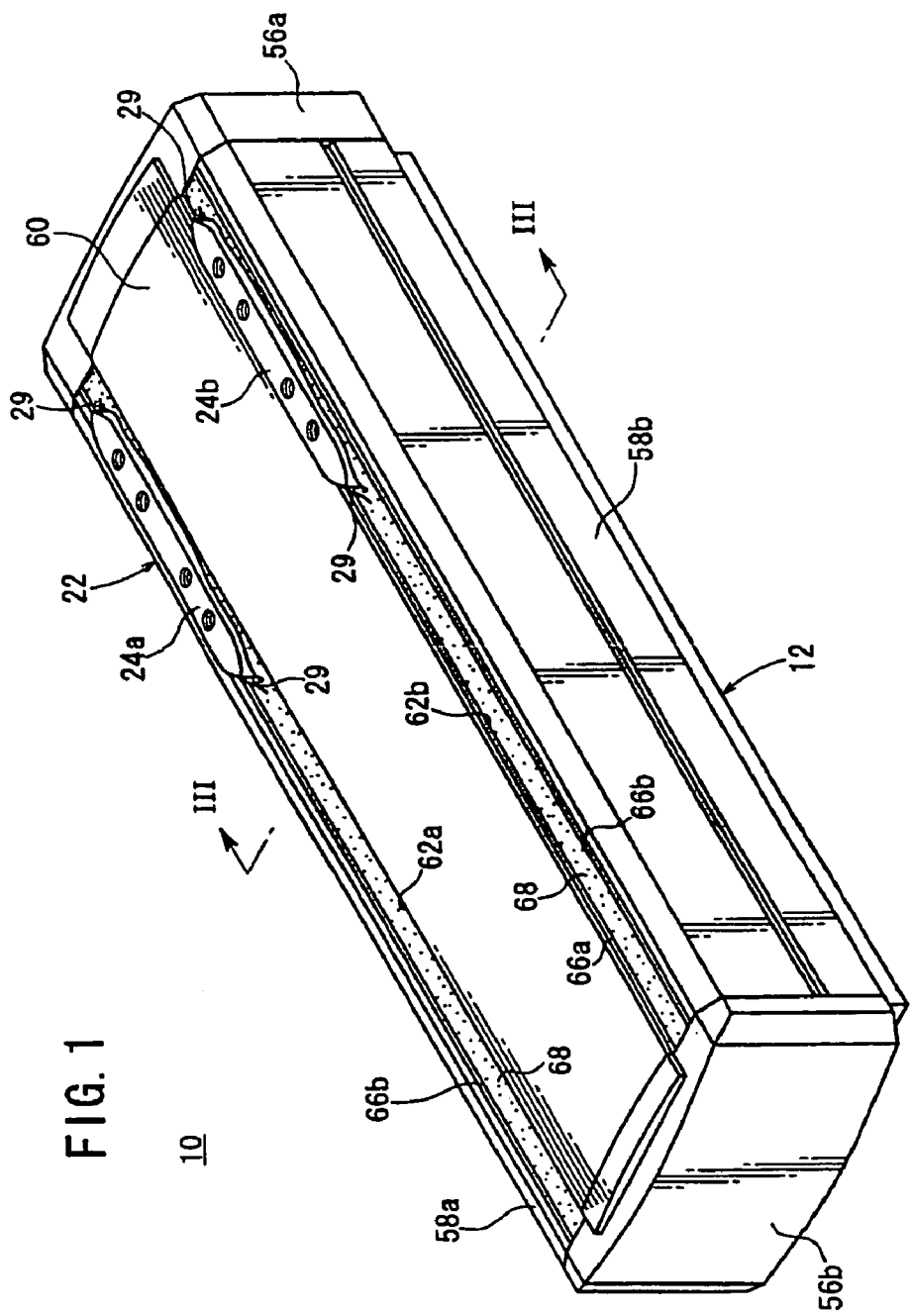
FIG. 1 is a perspective view of an actuator according to an embodiment of the present invention.

In FIG. 1, reference numeral 10 represents an actuator which has a sealing structure according to an embodiment of the present invention.

This actuator 10 has a long frame 12 whose cross section is almost concave. The frame 12 has through holes 14a to 14d (see FIG. 3) with a virtually rectangular cross section which are formed axially. These through holes 14a to 14d are used as passages for wires. At the bottom of the frame 12 are grooves 16a and 16b with a virtually T cross section which extend axially and are used for connection with another device.

At the top of the frame 12 are guide rails 18a and 18b which axially extend almost in parallel. Guide blocks 20a, 20c and 20b, 20d which are slidable along the axis of the guide rails 18a and 18b are located on the guide rails 18a and 18b respectively. Rolling members like balls (not shown) are provided on sliding parts of the guide rails 18a, 18b and the guide blocks 20a to 20d so that the guide blocks 20a to 20d move along the guide rails 18a and 18b smoothly.

Figure 2:
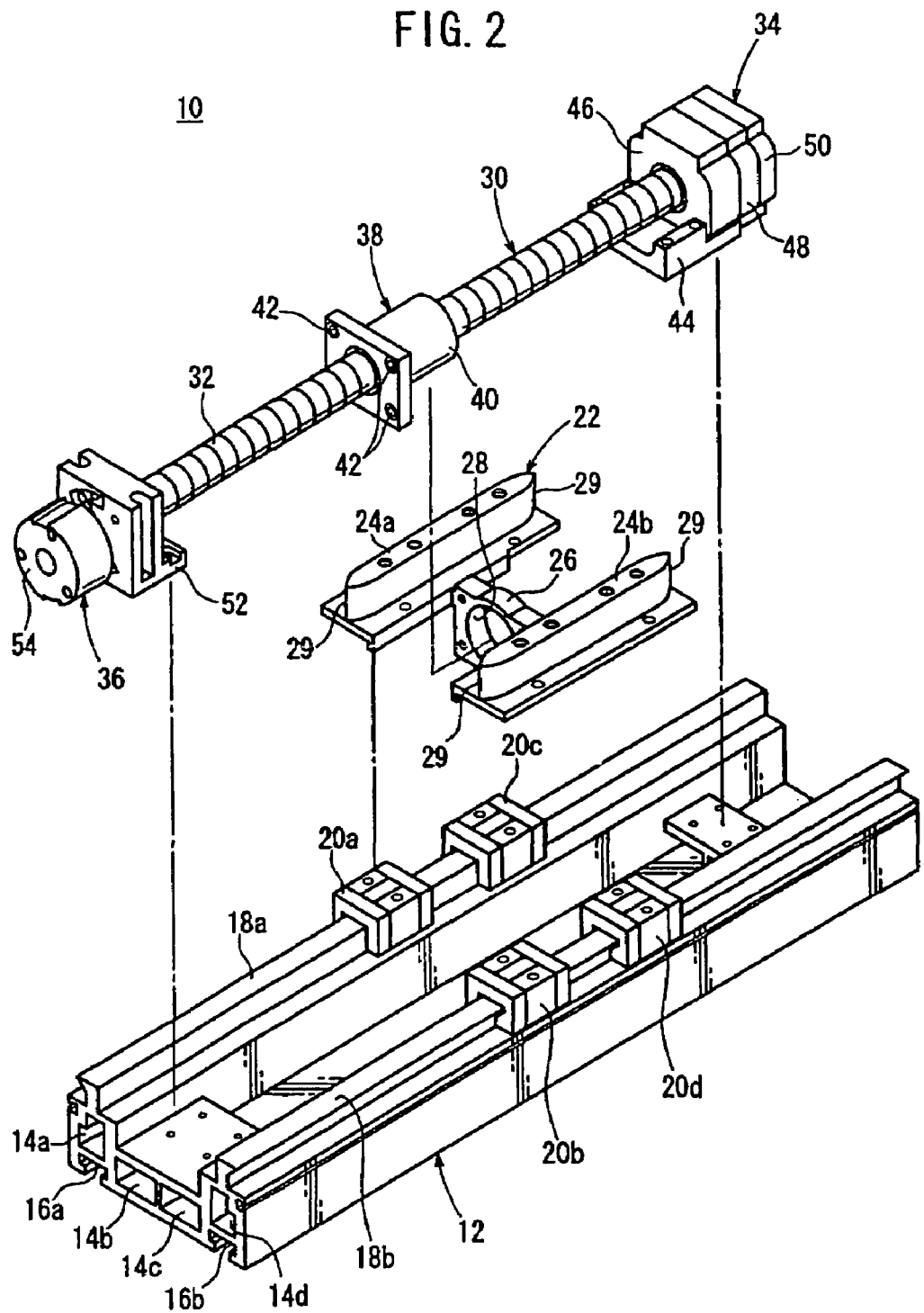
FIG. 2 is an exploded perspective view of the actuator shown in FIG. 1.
Figure 3:
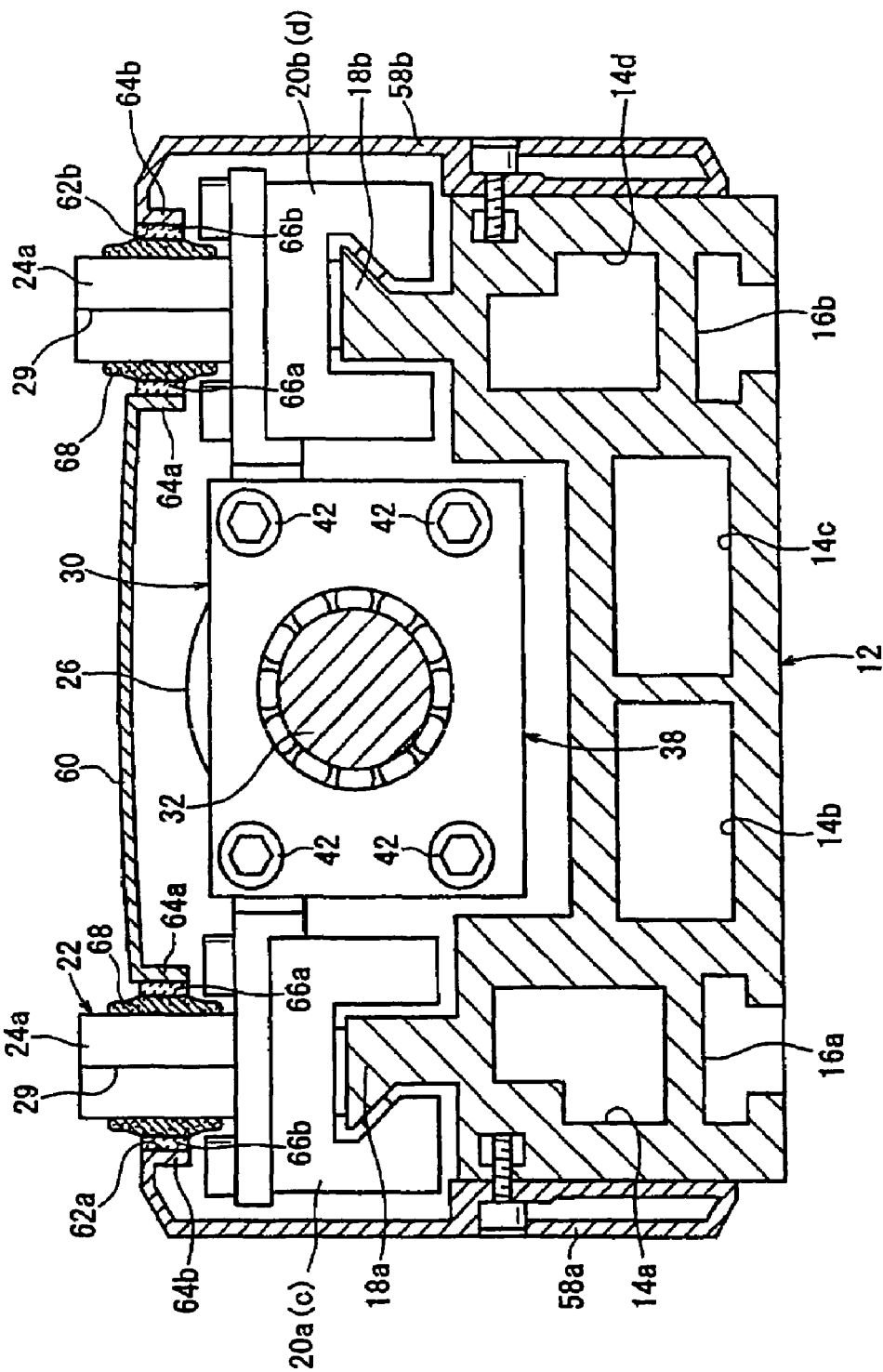
FIG. 3 is a longitudinal sectional view taken along the line III—III of FIG. 1.

On the guide blocks 20a to 20d are a pair of fixing blocks 24a and 24b which are fixed almost in parallel with a prescribed distance between them (see FIGS. 2 and 3). Between the fixing blocks 24a and 24b is a holding block 26, with a virtually square cross section, which is formed integrally with them. The holding block 26 has a circular hole 28.

Figure 4:
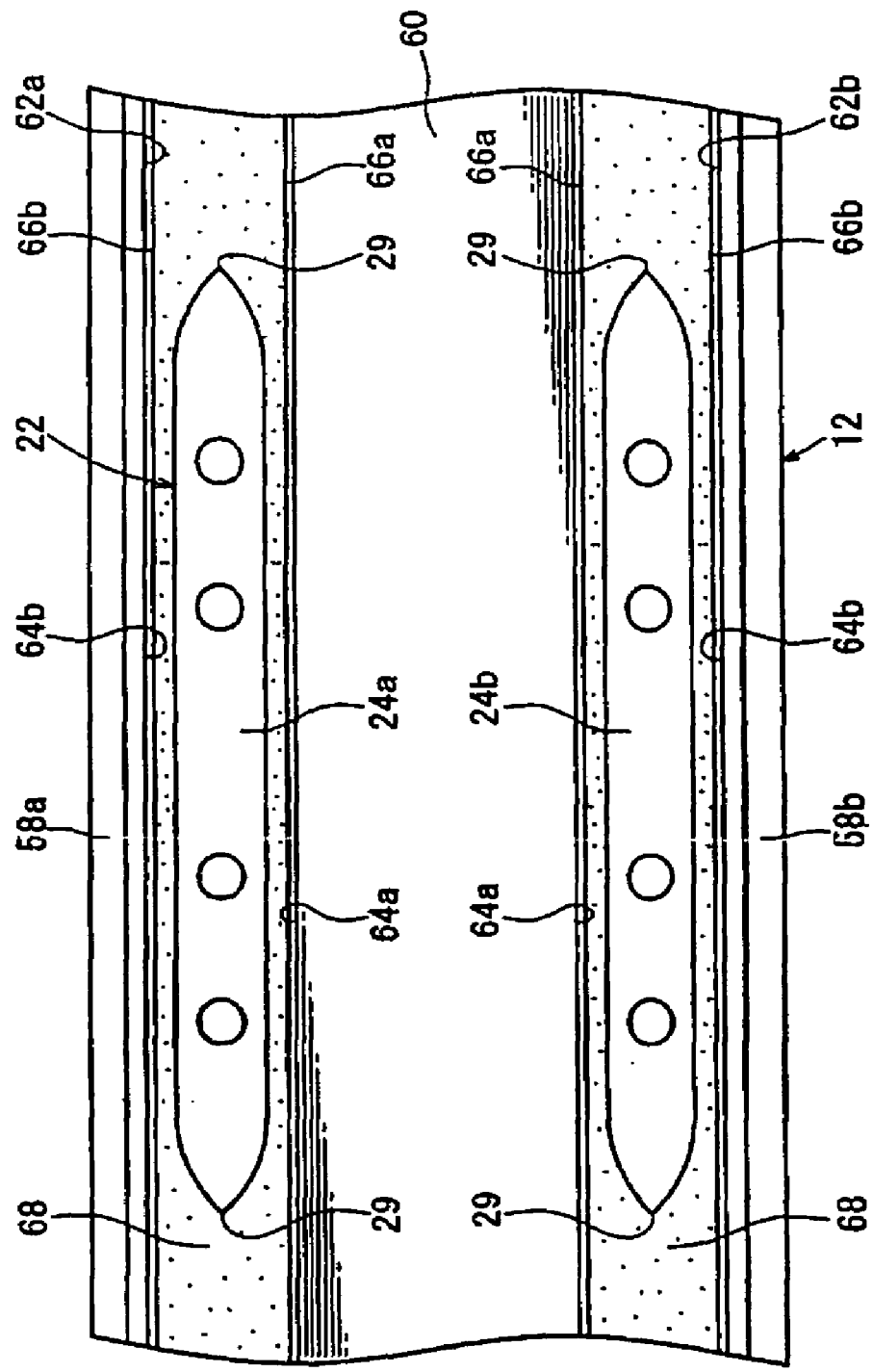
FIG. 4 is a partially schematic top view of the actuator shown in FIG. 1.

At each end of the fixing blocks 24a and 24b in the moving direction, there is a stem 29 which is tapered off towards the end (see FIG. 4).

A driving unit 30 is fixed to both ends of the frame 12 as shown in FIG. 2. The driving unit 30 integrally combines a motor 34 and an encoder 36 located along its axis at both ends of a ball screw 32 with an engagement block 38 which moves axially in engagement with the ball screw 32. The engagement block 38 has a cylindrical portion 40 which is fitted into the hole 28 of the holding block 26 through mounting holes 42.

As shown in FIG. 2, the motor 34 (rotational driving source) consists of: a motor fixing block 44 which is fixed at one end of the frame 12 with screws; a casing 46 with a virtually rectangular cross section connected integrally with the motor fixing block 44; and a stator 48 located around the casing 46. One end of the ball screw 32 is held inside the casing 46 and a rotor 50 is held on the ball screw 32.

The encoder 36 rotatably supports the other end of the ball screw 32. It consists of an encoder fixing block 52 fixed to one end of the frame 12 and an encoder body 54, coupled with the encoder fixing block 52, which detects the number of rotations or rotation angle of the ball screw 32. A detection signal concerning the number of rotations or rotation angle of the ball screw 32 which has been detected by the encoder body 54 is led through a lead wire (not shown) into a controller (not shown).

A pair of end covers 56a and 56b are located at both ends along the axis of the frame 12, facing each other as shown in FIG. 1. Also, a pair of side covers 58a and 58b are located at both sides along the axis of the frame 12, facing each other.

A top cover 60 (thin plate) is provided at the top of the frame 12. The frame 12, end covers 56a, 56b, side covers 58a, 58b and top cover 60 make up a chassis (box) of the actuator 10.

As illustrated in FIGS. 1 and 3, slits 62a and 62b extend along the axis of the frame 12 between the top cover 60 and the side covers 58a and 58b. The slits 62a and 62b are formed on the upper face of the actuator 10 as a pair with a prescribed distance almost from its center.

As shown in FIG. 3, walls 64a and 64b of deflexed shape protrude by a prescribed length downward from the ends of the top cover 60 and side covers 58a, 58b where the slits 62a and 62b are formed, respectively. The wall 64a of the top cover 60 faces the wall 64b of the side cover 58a (58b) each other almost in parallel with a prescribed distance between them. The distance between the walls 64a and 64b of the slit 62a (62b) is designed so that the fixing block 24a (24b) can move along the slit 62a (62b) without touching the fixing block 24a (24b).

Magnetic bodies 66a and 66b of magnetic material (for example, permanent magnet) are attached to the surfaces of the walls 64a and 64b facing each other along the length of the frame 12.

Figure 5:
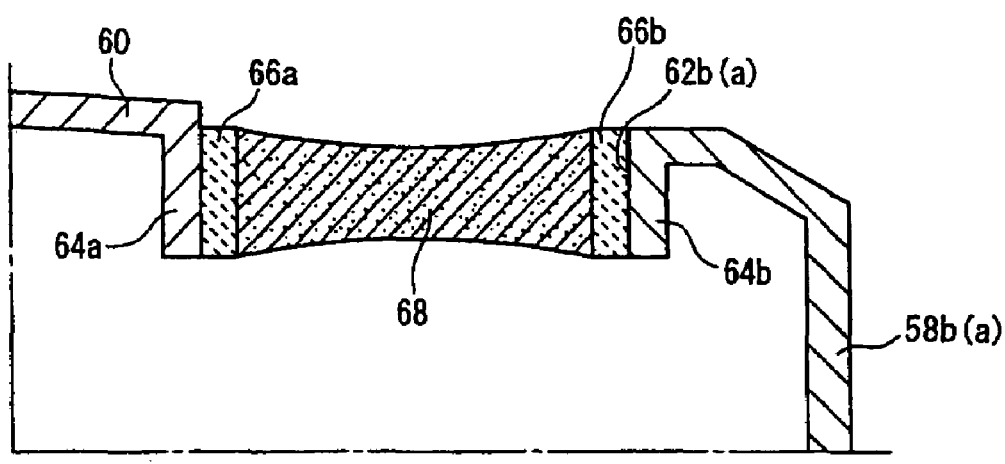
FIG. 5 is an enlarged fragmentary cross-sectional view showing a magnetic fluid held between magnetic bodies.

A magnetic fluid 68 is held between the magnetic bodies 66a and 66b by the magnetic force of the magnetic bodies 66a and 66b and the viscosity, surface tension, etc. of the magnetic fluid 68 (see FIG. 5). In other words, the magnetic fluid 68 is held between the walls 64a and 64b in a manner to connect the magnetic bodies 66a and 66b along the length of the frame 12.

This magnetic fluid 68 is a solution which contains a high concentration of ferromagnetic ultrafine particles of magnetite or the like dispersed in a liquid homogeneously. It is composed of three ingredients: a liquid as a medium, ferromagnetic ultrafine particles and a surface-active agent. It features both ferromagnetism as a solid substance and fluidity as a fluid.

The distance between the magnetic bodies 66a and 66b is designed so that the magnetic fluid 68 is held between the magnetic bodies 66a and 66b.

Since the magnetic fluid 68 is held between the magnetic bodies 66a and 66b by its viscosity, surface tension, etc., preferably the distance between the magnetic bodies 66a and 66b should be small to the extent that they do not touch the fixing blocks 24a and 24b when they are attached to the walls 64a and 64b.

Although the magnetic bodies 66a and 66b are located on the fixing block 24a (24b) side of the walls 64a and 64b in the abovementioned case, the present invention is not limited thereto. Instead, as shown in FIG. 7, the magnetic body 66a (66b) may be located with the wall 64a (64b) between it and the fixing block 24a (24b) (FIG. 6) in a way that the magnetic fluid 68 is held between the walls 64a and 64b.

The fixing block 24a (24b) as a component of the slider 22 passes through the slit 62a (62b) and protrudes upward by a prescribed height to transmit axial linear motion inside the chassis of the actuator 10 to the outside of the actuator 10. The slit 62a (62b) is properly closed by the magnetic fluid 68 held by the magnetic bodies 66a and 66b.

According to this embodiment, the actuator 10 is basically constituted as mentioned above. Next, its operation and operational advantages will be explained.

As illustrated in FIG. 2, the power source (not shown) is turned on to start the motor 34 to rotate the ball screw 32 which functions as a motor shaft. In this case, the number of rotations or rotation angle of the motor is detected by the encoder body 54 fitted to one end of the ball screw 32 and the detection signal is led through lead wires (not shown) in the through holes 14a to 14d into a controller (not shown).

The rotary motion of the ball screw 32 is transmitted to the engagement block 38 engaged with the ball screw 32 and transformed into a linear motion and the slider 22 holding the engagement block 38 moves axially as guided by the guide rails 18a and 18b.

As illustrated in FIG. 4, as the fixing block 24a (24b) moves axially, the magnetic fluid 68 on the advance direction side of the slider 22 changes with axial movement of the fixing block 24a (24b) from the condition (FIG. 5) that it closes the slit 62a (62b) while held between the magnetic bodies 66a and 66b to the condition (FIG. 6) that it is gradually split and pushed against the walls 64*a* and 64*b* of the slit 62*a* (62*b*) by the stem 29 of the fixing block 24*a* (24*b*).

Figure 6:
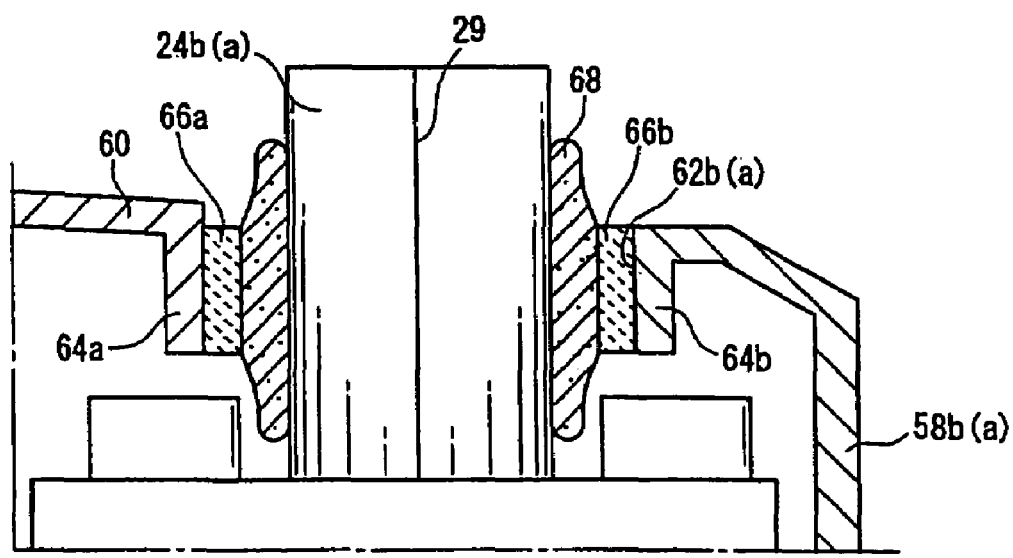
FIG. 6 is an enlarged fragmentary cross-sectional view showing an area around the walls to which the magnetic bodies shown in FIG. 3 are attached.
Figure 7:
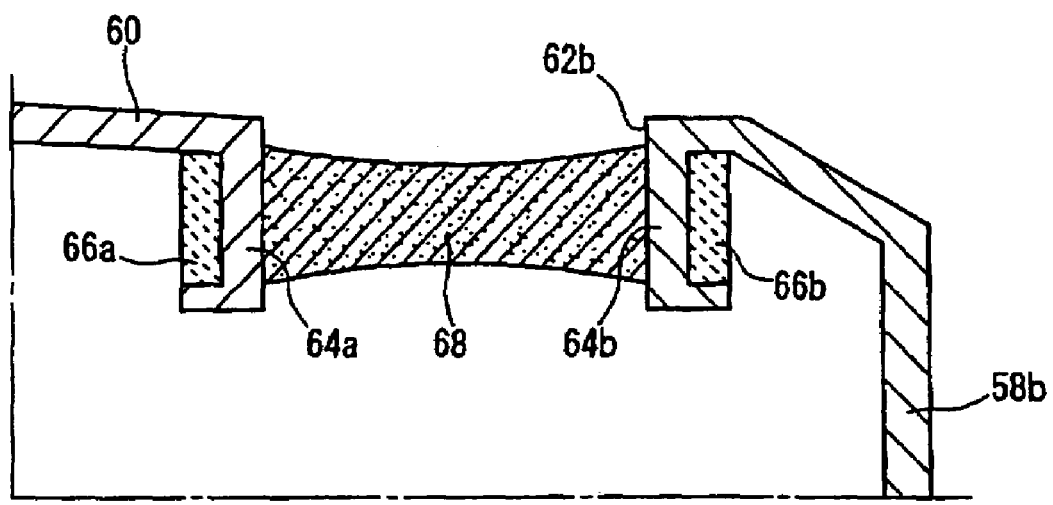
FIG. 7 is an enlarged fragmentary cross-sectional view showing magnetic bodies held on the side opposite to the side where the magnetic fluid is held between the walls as shown in FIG. 5.

As illustrated in FIGS. 3 and 6, the magnetic fluid 68 becomes completely split between the magnetic bodies 66*a*, 66*b* and the side faces of the slider 22 by the slider 22 (see FIGS. 2 and 3). Even in this condition, since the magnetic fluid 68 stays stuck to the side face of the slider 22, it prevents dust from going through the slit 62*a* (62*b*) into the inside of the actuator 10.

On the other hand, the magnetic fluid 68 on the side opposite to the advance direction of the slider 22 changes from the condition (FIGS. 3 and 6) that it is split and pushed against the walls 64*a* and 64*b* by the side faces of the fixing block 24*a* (24*b*), to the condition (FIG. 5) that it is again held between the magnetic bodies 66*a* and 66*b* and closes the slit 62*a* (62*b*) as it gradually flows back under the influence of the magnetic force of the magnetic bodies 66*a* and 66*b* and the viscosity, surface tension, etc. of the magnetic fluid 68.

In other words, the slit 62*a* (62*b*) is kept properly closed by the magnetic fluid 68, regardless of the fixing block 24*a* (24*b*) so that the magnetic fluid 68 prevents dust or other foreign matter from outside from entering into the inside of the actuator 10, or dust, grease or other foreign matter from the inside of the actuator 10 from flowing out.

As explained above, in this embodiment, the magnetic fluid 68 is held between the magnetic body 66*a* attached to the wall 64*a* of the top cover 60 and the magnetic body 66*b* attached to the wall 64*b* of the side cover 58*a* (58*b*) under the influence of the magnetic force of the magnetic bodies 66*a* and 66*b* and the viscosity, surface tension, etc. of the magnetic fluid 68 and thus the slit 62*a* (62*b*) is kept properly closed by the magnetic fluid 68 as the fixing block 24*a* (24*b*) moves along the slit.

Therefore, dust from outside cannot enter into the inside of the actuator 10 through the slits 62*a* and 62*b* and dust or other foreign matter which is generated inside the actuator 10 cannot flow out through the slits 62*a* and 62*b*. As a consequence, there is no possibility of dust or other foreign matter from the actuator 10 contaminating the air of the room where the actuator is installed. This means that the actuator 10 can be safely used in places which should be dust-free, such as clean rooms for medical purposes and food industries.

Since the slit 62*a* (62*b*) is closed by the magnetic fluid 68 as a liquid, the displacement resistance which occurs as the fixing block 24*a* (24*b*) moves along the slit 62*a* (62*b*) is smaller than when the slit is closed by a seal member made of elastic material such as rubber. Hence, the slider 22 can move more smoothly along the axis of the actuator.

No wear occurs in the magnetic fluid 68 held in the slit 62*a* (62*b*), which eliminates the need for replacement of a seal member or other troublesome maintenance work.

Figure 8:
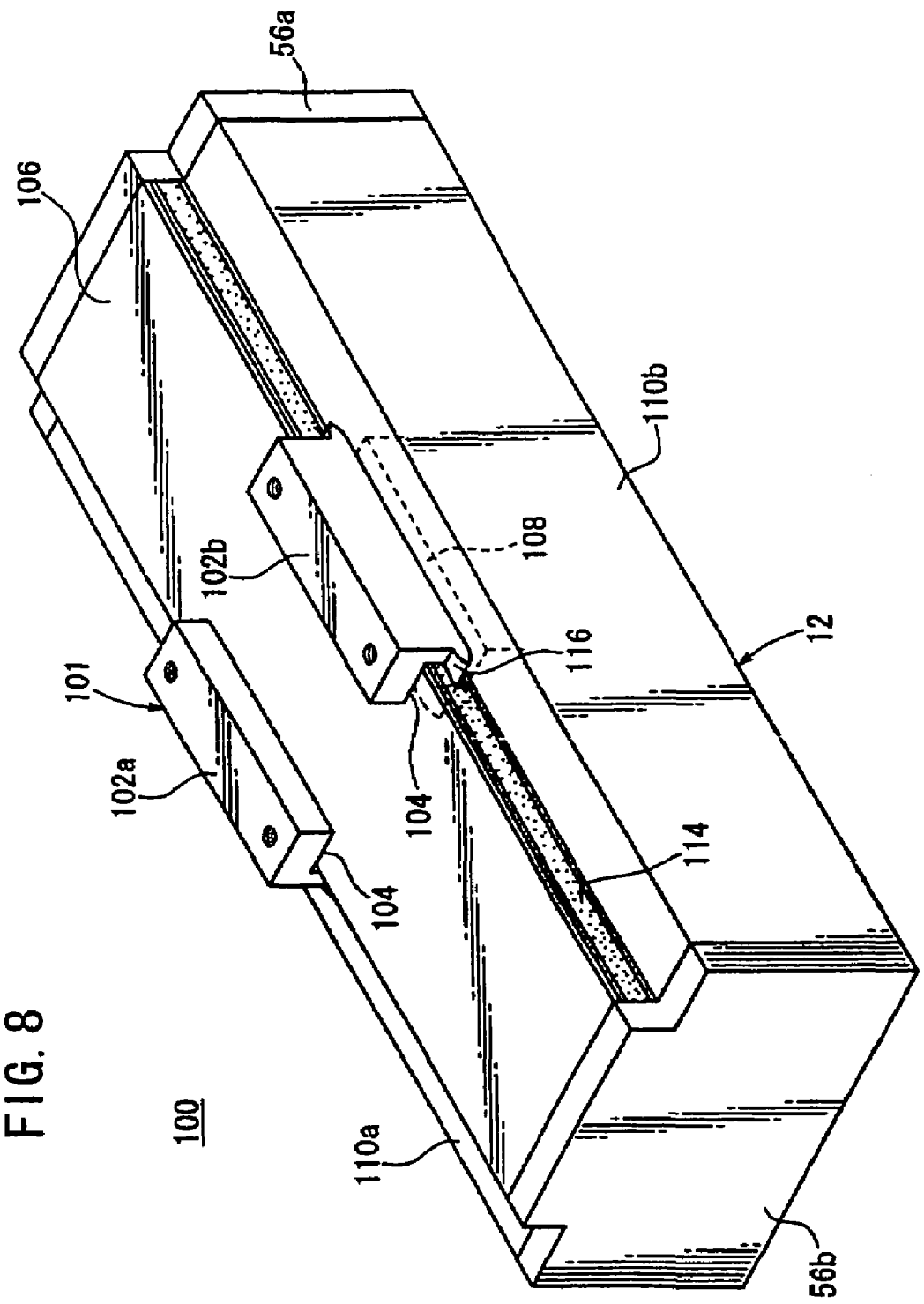
FIG. 8 is a perspective view of an actuator according to another embodiment of the present invention.

An actuator 100 according to another embodiment of the present invention is shown in FIG. 8. The same elements as those of the actuator 10 in the above embodiment are designated by the same reference numerals and their detailed descriptions are omitted.

The actuator 100 is different from the actuator 100 in the following points. One end of a top cover (first cover) 106 is inserted in a first groove 104 made in one side face of a fixing block 102*a* (102*b*) of a slider 101 and one end of a side cover (second cover) 110*a* (110*b*) is inserted in a second groove 108. There is a prescribed distance between the end of the top cover 106 and the end of the side cover 110*a* (110*b*) in the direction of height of the actuator body 12 and the slider 101 partially protrudes from the clearance almost horizontally. A magnetic body 112*a* (FIG. 9) extends along the length of the frame 12 on the lower face of the end of the top cover 106 and a magnetic body 112*b* (FIG. 9) extends along the length of the frame 12 on the upper face of the end of the side cover 110*a* (110*b*) (FIG. 9) and a magnetic fluid 114 is held between the magnetic bodies 112*a* and 112*b*.

Figure 10:
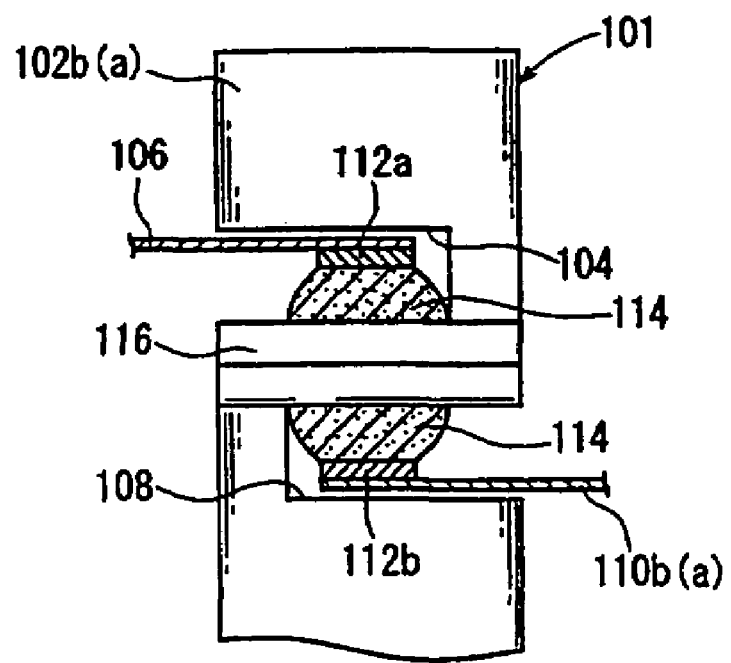
FIG. 10 is an enlarged fragmentary cross-sectional view showing a magnetic fluid held between a top cover and a side cover which is split by a connection.

As illustrated in FIG. 8, the first groove 104 is made, along the axis of the frame 12, in one side face of the fixing block 102*a* (102*b*) which virtually faces the center of the actuator 100 (FIG. 10).

As illustrated in FIG. 10, the first groove 104 has a prescribed depth which is measured virtually with respect to the center of the fixing block 102*a* (102*b*).

One end of the top cover 106 is inserted in the first groove 104 in a way not to touch the first groove 104. The magnetic body 112*a* is integrally attached to the lower face of the top cover 106 inserted in the first groove 104.

On the other hand, in the fixing block 102*a* (102*b*), the second groove 108 is made below the first groove 104 on the side opposite to the side where the first groove 104 is made, in a staggered manner. The second groove 108 has a prescribed depth which is measured virtually with respect to the center of the fixing block 102*a* (102*b*).

One end of the side cover 110*a* (110*b*) is inserted in the second groove 108 in a way not to touch the second groove 108. The magnetic body 112*b* is integrally attached to the upper face of the side cover 110*a* (110*b*) inserted in the second groove 108.

As illustrated in FIG. 10, there is a prescribed distance in the direction of height between the end of the top cover 106 inserted in the first groove 104 and the end of the side cover 110*a* (110*b*) inserted in the second groove 108; and the positional relation between the end of the top cover and that of the side cover is such that they overlap by a prescribed length in the direction virtually perpendicular to the axis of the frame 12. In other words, a clearance which is made between the end of the top cover 106 and that of the side cover 110*a* (110*b*) functions as a slit in which the fixing block 102*a* (102*b*) of the slider 101 moves axially.

Figure 9:
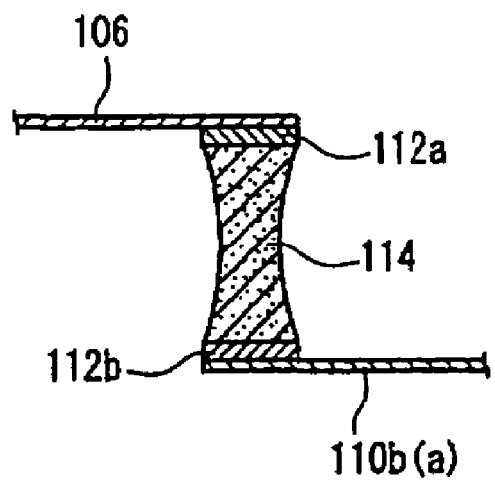
FIG. 9 is an enlarged fragmentary cross-sectional view showing a magnetic fluid held between a top cover and a side cover.

Furthermore, as illustrated in FIG. 9, the magnetic fluid 114 is held between the magnetic body 112*a* attached to the top cover 106 and the magnetic body 112*b* attached to the side cover 110*a* (110*b*). The magnetic fluid 114 is held under the influence of the magnetic force of the magnetic bodies 112*a* and 112*b* and the viscosity, surface tension, etc. of the magnetic fluid 114.

Also, as illustrated in FIG. 10, a virtually horizontal connection 116 is formed between the first groove 104 and the second groove 108 of the fixing block 102*a* (102*b*). In other words, the fixing block 102*a* (102*b*) has the connection 116 which lies between the end of the top cover 106 and the end of the side cover 110*a* (110*b*).

As illustrated in FIG. 8, as the ball screw 32 (FIG. 2) is rotated as driven by the motor 34 (FIG. 2) to move the slider 101 axially, the magnetic fluid 114 on the advance direction side of the slider 101 changes with axial movement of the fixing block 102*a* (102*b*) from the condition (FIG. 9) that it is held between the magnetic bodies 112*a* and 112*b* and closes the clearance between the top cover 106 and the side cover 110*a* (110*b*), to the condition (FIG. 10) that it is gradually split by the connection 116 of the fixing block 102*a* (102*b*) while being pushed up toward the top cover 106 and down toward the side cover 110*a* (110*b*).

Then, as illustrated in FIG. 10, the magnetic fluid 114 becomes completely split by the slider 101, with some part of the fluid between the magnetic body 112*a* and the connection 116, and the rest of the fluid between the connection 116 and the magnetic body 112b. Even in this condition, the magnetic fluid 114 stays stuck to the upper and lower faces of the connection 116 of the fixing block 102a (102b), which prevents dust or other foreign matter from outside from entering into the inside of the actuator 100 through the clearance between the top cover 106 and side cover 110a (110b).

On the other hand, the magnetic fluid 114 on the side opposite to the advance direction of the slider 101 changes from the condition (FIG. 10) that it is split by the connection 116 of the fixing block 102a (102b) with some part pushed against the top cover 106 and the rest against the side cover 110a (110b), to the condition (FIG. 9) that, under the influence of the magnetic force of the magnetic bodies 112a and 112b and the viscosity, surface tension, etc. of the magnetic fluid 114, it gradually flows back and comes to stay held between the magnetic bodies 112a and 112b, again closing the clearance between the top cover 106 and side cover 110a (110b).

Therefore, the magnetic fluid 114 is held between the magnetic body 112a attached to the lower face of the top cover 106 and the magnetic body 112b attached to the upper face of the side cover 110a (110b) under the influence of the magnetic force of the magnetic bodies 112a and 112b and the viscosity, surface tensions etc. of the magnetic fluid 114 and thus the clearance between the top cover 106 and the side cover 110a (110b) in which the fixing block 102a (102b) moves is kept properly closed by the magnetic fluid 114.

Even while the slider 101 passes through the magnetic fluid 114, the magnetic fluid 114 stays held through the connection 116 of the fixing block 102a (102b) and keeps the inside of the actuator 100 airtight.

In addition, since the magnetic fluid 114 which closes the clearance between the top cover 106 and the side cover 110a (110b) is a liquid, the displacement resistance which occurs when the connection 116 of the fixing block 24a (24b) moves axially pushing and splitting the magnetic fluid 114 is reduced. Therefore, the slider 101 axially moves more smoothly.

Therefore, the present invention offers the following advantages. When the slider moves in the slit along the axis of the body, the magnetic fluid on the advance direction side of the slider is split by the slider and the magnetic fluid thus split by the slider closes the slit again on the side opposite to the advance direction of the slider. Therefore, regardless of movement of the slider, the slit is kept properly closed by the magnetic fluid. This prevents dust or other foreign matter from outside from entering into the inside of the actuator through the slit and dust or other foreign matter generated inside the actuator 10 from flowing out through the slit.

What is claimed is:

1. An actuator which transforms rotational driving force of a rotational driving source into a linear motion through a driving force transmitter and moves a slider axially to transport a workpiece,
   the actuator comprising:
   a body in which the driving force transmitter is located;
   a slider which is partially exposed from a slit extending along the length of the body and moves along the axis of the body;
   a pair of magnetic bodies which extend along the slit by a prescribed length and face each other with the slider between them; and
   a magnetic fluid which is indirectly held between the pair of magnetic bodies, wherein only the magnetic fluid closes the slit, and is split by the slider as the slider moves.

2. The actuator as claimed in claim 1, wherein the slit is provided between a first cover of the body and a second cover which is located away from the first cover by a prescribed distance virtually vertically.

3. The actuator as claimed in claim 1, wherein the pair of magnetic bodies are disposed next to the body and away from the magnetic fluid.

4. An actuator which transforms rotational driving force of a rotational driving source into a linear motion through a driving force transmitter and moves a slider axially to transport a workpiece,
   the actuator comprising:
   a body in which the driving force transmitter is located, the body having a pair of walls defining a slit therebetween;
   a slider which is partially exposed from the slit extending along the length of the body and moves along the axis of the body;
   a pair of magnetic bodies disposed along the walls away from the slit and extending along the walls by a prescribed length, and face each other with the slider between them; and
   a magnetic fluid disposed between the walls, and only the magnetic fluid closing the slit.

* * * * *